United States Patent [19]

Fonne

[11] 3,938,279

[45] Feb. 17, 1976

[54] GROWTH MEDIUM TO COVER THE SURFACE OF THE GROUND

[75] Inventor: Gunnar Johan Fonne, Porsgrunn, Norway

[73] Assignee: Norsk Hydro A. S., Oslo, Norway

[22] Filed: Feb. 8, 1974

[21] Appl. No.: 440,840

[52] U.S. Cl. .......................... 47/9; 106/76; 106/90; 106/287 SS
[51] Int. Cl.² ...................... A01C 1/00; C04B 13/22
[58] Field of Search ................. 106/287 SS, 89–90, 106/76; 47/9, 58, DIG. 10; 61/35, 36 R

[56] References Cited
UNITED STATES PATENTS

| | | | |
|---|---|---|---|
| 1,882,377 | 10/1932 | Whittelsey | 47/9 |
| 2,802,303 | 8/1957 | Weeks | 47/9 |
| 3,600,852 | 8/1971 | Burke et al. | 47/58 |
| 3,635,742 | 1/1972 | Fujimasu | 106/287 SS |

OTHER PUBLICATIONS

Turf Management, Musser, McGraw–Hill, 1962, p. 25 cited.

*Primary Examiner*—Robert E. Bagwill
*Attorney, Agent, or Firm*—Wenderoth, Lind & Ponack

[57] ABSTRACT

The invention relates to a growth medium which is to be used for covering the surface of the ground and which consists of or contains a mixture of an inorganic mineral binder based on cement, an organic fibrous material and fertiliser.

3 Claims, No Drawings

GROWTH MEDIUM TO COVER THE SURFACE OF THE GROUND

This invention concerns a growth medium intended to be used to cover and at the same time bind earth or soil which is threatened by erosion and is hostile to vegetation, and where it is not possible to establish a satisfactory vegetation by normal sowing methods. The growth medium according to the invention consists of a dry mixture of components intended to be added to water for direct spraying on to the ground by means of a special apparatus called a hydroseeder, which has recently been developed for the purpose of sowing large areas of land devoid of vegetation. After spraying the growth medium sets and forms a relatively thin coating which binds the soil beneath, and at the same time holds and protects the seeds and provides the necessary moisture and nutrition for their germination and initial growth, until the roots are long enough to penetrate and bind the underlying soil.

The need for growth media of this type has greatly increased of late. Modern construction and engineering activities with the building of roads, airfields, dams, dykes, etc., result in extensive and unsightly changes in the natural surroundings by the creation of huge road embankments, rock tips, earth fills, etc., which cannot be sown in the usual way and therefore remain as ugly scars in the landscape.

The lack of vegetation leads to serious drawbacks. In dry weather the dust generated can affect road safety and running water caused by heavy rains can cause damage. Apart from the practical drawbacks it is also necessary for esthetic and environmental reasons to make provision for covering these areas with vegetation as soon as possible.

Growth media for this purpose are already known, but they all have certain shortcomings and drawbacks and do not fulfil the most important requirements demanded of them. It is thus known to employ a number of different organic binders or adhesives, either alone or mixed with fibre-forming organic humous materials such as cellulose fibres, crushed peat, leaves, straw and so on. However, it has been difficult to find materials which bind satisfactorily with the underlying ground, and when they are employed together with ordinary commercial fertilisers it has resulted in harmful precipitation which has caused great problems. Adhesive which do not cause these problems are known, but their high price prohibits their use.

Known binding agents which have been employed include tall oil or pine oil which is marketed by Esskron AB, Sweden, under the tradename "Essbinder".

Further, it is known to make use of an asphalt emulsion as a binder, either alone or together with finely crushed straw or leaves. Seeds and fertiliser may also be added to the dry mixture, or added when the mixture is being made up with water. The aqueous mixture is then sprayed on the ground by means of a hydroseeder (Gartnerwalt No. 56, 1956, page 141).

Recently it was proposed to employ ordinary plaster as a binding agent, it being maintained that a gentle-acting, neutral mortar of calcium sulphate has a positive influence on the germinating power and the growth of the seeds. The mortar is then used together with a non-hardening filler such as powdered, deadburnt plaster and gypsum. Further, minor quantities of additives able to absorb and hold water and nutrients may also be used.

However, tests have proved that such substances have poor binding effect. Thus it is necessary when there is danger of soil erosion to use fibrous reinforcing materials, such as glass fibre netting, which is placed on top of the soil, etc., before applying the aqueous seed mixture.

It is further known from Norwegian Pat. No. 87342 to stabilise the soil by mixing into it a composition of cement together with a minor quantity of pentachloro phenol and chlorinated cresylic acid with a powdered vegetable substance as a filler. However, this is not a growth medium, but the utilisation of a soil stabilising material for a completely different purpose, namely to surface roads, aircraft runways, etc., where germination and growth should preferably be avoided.

The following main requirements should be set for a satisfactory growth medium:

1. It should provide the basis for the existence of some sort of vegetation.
2. It should be able to adhere to sand, gravel, etc.
3. It should have the ability to set or harden.
4. It should have the ability to absorb and hold water.
5. It should be possible to apply it by means of the hydroseeder without clogging it.
6. It should be low in price.

None of the previously known growth media appear to fulfil all these requirements. There have been specific problems in connection with the ability to bind with the underlying ground and the price, see above. According to the invention it has now been found that strong-acting, inorganic mineral binders based on cement are also well suited as binding and setting agents in a growth medium. Binders of this type are extremely alkaline, and it has been immediately assumed that the seeds will be prevented from germinating and growing. Surprisingly it has now been found that the germinating power of the seeds is not impaired, and that the hardened material is also able to absorb and hold water and nutrients. Among the binding agents of this type have been tried so far ordinary Portland cement has proved to be especially well suited, as this provides a hardened material which binds very well with the underlying ground and is very resistant to water and heavy rains, at the same time being very economical to use.

The growth medium contains or consists of a mixture of cement, organic fibrous material and fertiliser. The fibrous component may be crushed peat, bark, leaves, straw, cellulose fibres, wood or paper pulp, etc. A material which has given especially good results is knotter pulp, a by-product of the cellulose pulp industry. The knotter pulp is dried and torn into a loose, short-fibred mass which is blended with dry cement and fertiliser and also with seeds if required. The fertiliser may be any type of commercial fertiliser, e.g. NPK fertiliser, urea or nitrate. Neutral fertilisers in the form of dried manure may also be employed.

The dry mixture does not deteriorate in storage. Prior to use it is mixed with water in a hydroseeder, and then sprayed on to the ground. If seeds are not added at an earlier point they may be added when mixing the growth medium with water, or they may be sown separately. The ratio between the fibrous material and binding agent is not important. Compositions consisting of from 75 to 60 percent by weight of cement and from 25 to 40 percent by weight of dry knotter pulp have been employed, and satisfactory results have been obtained. Neither is the quantity of water to be added important. However, the best result seems to be obtained with a mixture consisting of one part by weight of growth medium to ten parts by weight of water. This gives a composition which is especially well suited for direct spraying with a hydroseeder.

EXAMPLE 1

The following example shows the excellent ability of the combination of knotter pulp and cement to prevent leaching of the soil on to which this composition is sprayed. 20 g dry, finely-torn knotter pulp, 30 g Portland cement, 15.6 g chlorine-free NPK fertiliser and 820 ml water were well mixed together. An aluminium trough measuring 0.13 m$^2$ and 2.5 cm deep was filled with ordinary sand which was then covered with the above mixture. The thick, runny mixture was evenly spread over the sand with a special spreader. This coating was left to set for 24 hours in normal room temperature. Thereafter the trough was placed under a container at an angle of 30° and at a distance of 22 cm. The container has a number of holes in the bottom which allow an even flow of heavy "rain" (about 2 litres per minute) to fall on the test specimen. After two hours the surface and the underlying sand were untouched.

EXAMPLE 2

Example 1 was repeated except that in addition to knotter pulp, cement, fertiliser and water 3.25 g of grass seed were also added and this mixture was treated as described above. The subsequent rain treatment showed the same good result, the surface and the underlying sand being untouched.

EXAMPLE 3

A growth test was performed as follows: 154 g dry, finely torn knotter pulp, 346 g Portland cement, 154 g NPK fertiliser, 15 g rye grass seed (Lolium temulentum) and 6 litres of water were mixed together and evenly spread over 1 m$^2$ of soil. 15 g rye grass seed were then sown in the conventional way without the addition of knotter pulp and cement. The two lots of grass were compared and were not found to differ from each other to any particular extent.

EXAMPLE 4

Example 1 was repeated except that instead of knotter pulp a mass of finely torn paper was used. This surface layer had the same good properties as described in Example 1.

EXAMPLE 5

After the eruption on Vestmannaeyjar in Iceland in 1973 most of the area was covered with a thick layer of lava and vulcanic ash. In order to enable the island to be re-inhabited it was necessary to stabilise this layer of ash, and soon large areas were sown and fertilised. The establishment of grass in this movable ash, however, was very difficult and most of the work carried out was in vain. Then experiments were made with a mixture of 33 kg knotter pulp, 66 kg cement, 33 kg NPK fertiliser and 15 kg grass seed, which were mixed with water and sprayed on to the ash by means of a hydroseeder over an area of approximately one quarter of an acre (1,000 m$^2$). After two weeks the growth was well established on a stable underlying surface, and after one month the layer of ash was well on its way to becoming stabilised by the grass and its roots.

The ratios of fibrous material and cement can be greatly varied. The amount of cement depends on the character of the underlying material which is to be protected. The same applies to the amount of fibrous material. In general 20 to 200 g per m$^2$ is employed. On loose sand in exposed places, e.g. on step slopes, approximately 150 g fibrous material per m$^2$ should be employed in order to provide a sufficiently good cover. On the other hand the amount of cement can vary from 50 g to 1000 g per m$^2$, but it should preferably be between 200 to 400 g per m$^2$. It would be expedient to use 10 to 100 g fertiliser per m$^2$, and then preferably 20 to 40 g per m$^2$. Suitable weight ratios between cement/fibrous material/fertiliser will, as mentioned, vary according to the type of terrain and the surface of the ground. Generally it may be specified as 5-100/5-40/1-20, especially 10-40/5-20/5-15. A commonly used ratio by weight is approximately 2:1:1.

I claim:

1. A growth medium for covering the surface of ground which comprises a mixture of Portland cement, an organic fibrous material and fertilizer in a weight ratio of 10–40:5–20:5–15.

2. A growth medium according to claim 1 wherein the organic fibrous material consists of knotter pulp.

3. A growth medium according to claim 1 further containing seeds.

* * * * *